(12) United States Patent
Ohira et al.

(10) Patent No.: US 8,794,798 B2
(45) Date of Patent: Aug. 5, 2014

(54) WHITE FILM AND SURFACE LIGHT SOURCE USING SAME

(75) Inventors: Takayuki Ohira, Mishima (JP);
Shigetoshi Maekawa, Otsu (JP);
Daisuke Ogata, Otsu (JP); Masatoshi Izawa, Otsu (JP); Kozo Takahashi, Otsu (JP)

(73) Assignee: Toray Industries, Inc. (JP)

( * ) Notice: Subject to any disclaimer, the term of this patent is extended or adjusted under 35 U.S.C. 154(b) by 195 days.

(21) Appl. No.: 13/580,714

(22) PCT Filed: Feb. 18, 2011

(86) PCT No.: PCT/JP2011/053486
§ 371 (c)(1),
(2), (4) Date: Aug. 23, 2012

(87) PCT Pub. No.: WO2011/105295
PCT Pub. Date: Sep. 1, 2011

(65) Prior Publication Data
US 2012/0320600 A1    Dec. 20, 2012

(30) Foreign Application Priority Data

Feb. 26, 2010 (JP) ................. 2010-041581

(51) Int. Cl.
*F21V 7/10* (2006.01)
*C08J 5/18* (2006.01)
*G02B 5/02* (2006.01)

(52) U.S. Cl.
CPC ... *C08J 5/18* (2013.01); *F21V 7/10* (2013.01); *C08J 2367/00* (2013.01); *G02B 5/0242* (2013.01); *G02B 5/0247* (2013.01); *G02B 5/0284* (2013.01); *G02B 6/0055* (2013.01); *G02B 6/0065* (2013.01)
USPC .................................................. 362/296.01

(58) Field of Classification Search
CPC .............. F21V 7/22; F21V 7/00; F21V 7/10; G02B 5/0242; G02B 5/0247; G02B 5/0284; G02B 6/0055; G02B 6/0065; G02B 6/0043; C08J 5/18
See application file for complete search history.

(56) References Cited

U.S. PATENT DOCUMENTS

| 5,084,334 | A * | 1/1992 | Hamano et al. | 428/304.4 |
| 5,422,175 | A * | 6/1995 | Ito et al. | 428/304.4 |
| 7,285,327 | B2 * | 10/2007 | Mimura et al. | 428/319.3 |
| 8,227,073 | B2 * | 7/2012 | Fujii et al. | 428/212 |
| 8,300,172 | B2 * | 10/2012 | Sato et al. | 349/62 |
| 8,486,519 | B2 * | 7/2013 | Mimura et al. | 428/304.4 |
| 8,709,589 | B2 * | 4/2014 | Aoyama et al. | 428/317.9 |
| 2003/0068466 | A1 * | 4/2003 | Mimura et al. | 428/102 |

(Continued)

FOREIGN PATENT DOCUMENTS

| JP | 2000-135766 A | 5/2000 |
| JP | 2000-202972 A | 7/2000 |

(Continued)

*Primary Examiner* — Bao Q Truong
(74) *Attorney, Agent, or Firm* — DLA Piper LLP (US)

(57) ABSTRACT

A white film has reflective properties, concealing properties and film-forming stability and can be made into a thin film, a white film, which contains voids therein and satisfies the following formulae (i) to (iii) is provided:

$0.6 \leq nB/nA \leq 0.9$ (i)

$20 \leq nA$ (ii)

$15 \leq nB$ (iii)

(wherein, nA represents the number of interfaces in 10 μm of the surface layer in the film thickness direction; and nB represents the number of interfaces in ±5 μm of the central part in the film thickness direction).

12 Claims, 1 Drawing Sheet

(56) References Cited

U.S. PATENT DOCUMENTS

| | | | |
|---|---|---|---|
| 2007/0014982 A1* | 1/2007 | Mimura et al. | 428/319.3 |
| 2009/0269563 A1* | 10/2009 | Naruse et al. | 428/220 |
| 2010/0209694 A1* | 8/2010 | Aoyama et al. | 428/317.9 |

FOREIGN PATENT DOCUMENTS

| | | |
|---|---|---|
| JP | 2001-288291 A | 10/2001 |
| JP | 2001-334570 A | 12/2001 |
| JP | 2001-334623 A | 12/2001 |
| JP | 2001-342274 A | 12/2001 |
| JP | 2002-040214 A | 2/2002 |
| JP | 2003-160682 A | 6/2003 |
| JP | 2009-096999 A | 5/2009 |
| JP | 2009-132813 A | 6/2009 |
| JP | 2009-173015 A | 8/2009 |

* cited by examiner

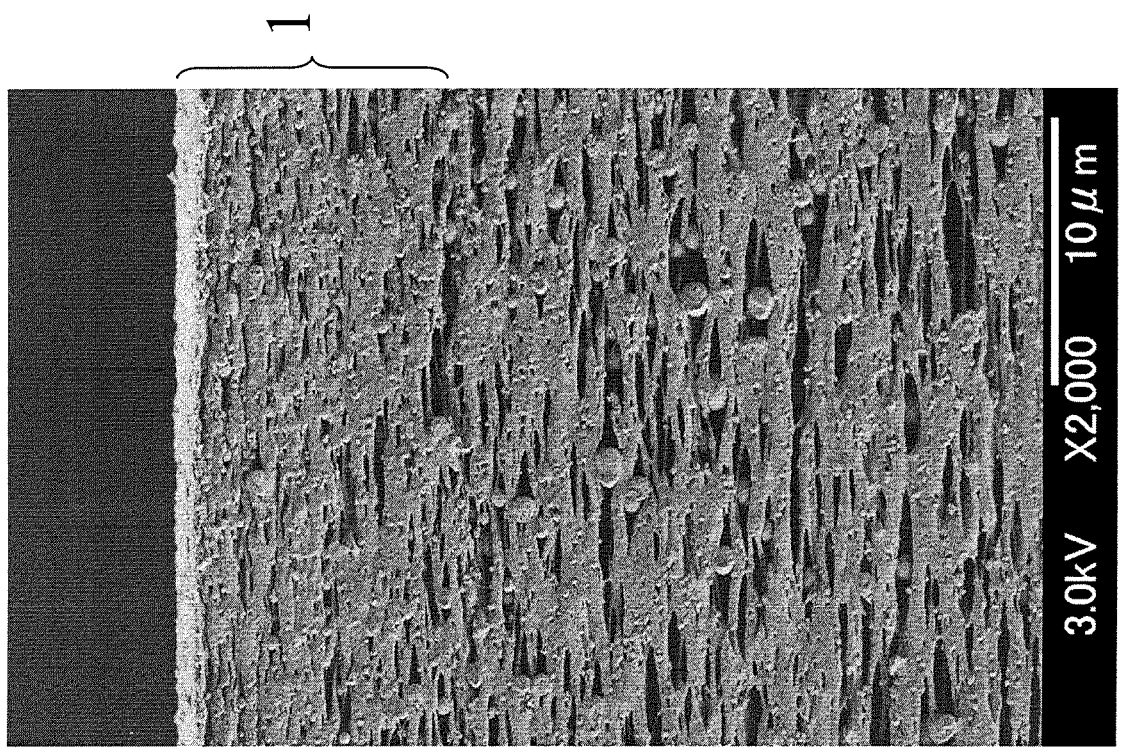

WHITE FILM AND SURFACE LIGHT SOURCE USING SAME

TECHNICAL FIELD

The present invention relates to a white film. More particularly, the present invention relates to a white film suitably used as a reflective member for surface light source.

BACKGROUND ART

In recent years, as display devices of personal computers, televisions, cellular phones and the like, a large number of displays utilizing liquid crystal are used. In these liquid crystal displays, a surface light source called backlight is provided to irradiate light from the backside, thereby allowing images to be displayed. In order to comply with the demand that the entire screen must be uniformly irradiated, such backlight has a structure of a surface light source referred to as "edge-type" or "direct-type". Among such backlights, for those thin liquid crystal displays used in notebook computers and the like that are desired to be made thin and small, an edge-type backlight, that is, a type of backlight in which a light source is arranged laterally with respect to the screen is applied.

In this edge-type backlight, a cold cathode fluorescent lamp or LED is used as a light source and light is uniformly propagated and diffused from the edge of a light guide plate to uniformly irradiate the entire liquid crystal display. In addition, in order to utilize light more efficiently, a reflection plate is provided around the light source and in order to allow the light diffused from the light guide plate to be efficiently irradiated to the side of the liquid crystal display, a reflection plate is also provided in the back of the light guide plate. By this constitution, the loss of the light emitted from the light source is reduced and a function to brightly illuminate the liquid crystal display is imparted.

Meanwhile, in those backlights for big screens used in liquid crystal display televisions, in addition to the edge-light system, a direct-type light system is employed. In this system, cold cathode fluorescent lamps are arranged in parallel on the backside of liquid crystal panel and a reflection plate is further arranged in the back of the cold cathode fluorescent lamps. By this constitution, the light emitted from the light source is effectively irradiated to the side of the liquid crystal display.

In such reflection plates used in a backlight for liquid crystal displays, as cellular phones and notebook computers are made thinner and smaller and televisions are made bigger, there is an increasing demand for a reflection plate which, despite being thin, has excellent reflective properties, excellent light-concealing properties and high rigidity.

Conventionally, in reflection plates, a constitution which utilizes light reflection produced by the differences in the refractive index at the interfaces between minute voids and matrix resin contained in a film is widely employed (see Patent Document 1). In order to achieve superior reflective properties, the shape and number of the voids are critical, and there is a reflection plate in which these properties are controlled (see Patent Documents 2 to 6).

PRIOR ART DOCUMENTS

Patent Documents

Patent Document 1: JP 2002-40214A
Patent Document 2: JP 2000-135766A
Patent Document 3: JP 2001-334623A
Patent Document 4: P 2003-160682A
Patent Document 5: JP 2009-173015A
Patent Document 6: JP 2001-288291A

SUMMARY OF THE INVENTION

Problems to be Solved by the Invention

However, with the constitutions disclosed in the above-described Patent Documents 1 to 6, a film which is thin and have sufficient reflective properties demanded by the current market cannot be attained. In addition, when a film is made to contain a large number of voids therein in an attempt to improve the reflective properties, breakage of the film occurs frequently, making it to difficult to form a sheet therefrom. Even if a sheet could be formed, problems are likely to occur in terms of the concealing properties, rigidity, productivity and cost.

An object of the present invention is to provide a white film which has reflective properties, concealing properties and film-forming stability at the same time and can be made into a thin film. Further, another object of the present invention is to provide a surface light source which has excellent brightness characteristics by comprising the white film.

Means for Solving the Problems

Thus, in order to achieve the above-described objects, the present invention adopts one of the following constitutions.
(1) A white film, which contains voids therein and satisfies the following formulae (i) to (iii):

$$0.6 \leq nB/nA \leq 0.9 \quad \text{(i)}$$

$$20 \leq nA \quad \text{(ii)}$$

$$15 \leq nB \quad \text{(iii)}$$

(wherein, nA represents the number of interfaces in 10 μm of the surface layer in the film thickness direction; and nB represents the number of interfaces in ±5 μm of the central part in the film thickness direction).
(2) The white film according to the above (1), which satisfies the following formula (iv):

$$vB > vA \quad \text{(iv)}$$

(wherein, vA represents the void ratio in 10 μm of the surface layer in the film thickness direction; and vA represents the void ratio in ±5 μm of the central part in the film thickness direction).
(3) The white film according to the above (1) or (2), wherein the white film has a flexural rigidity of not less than 1.1 (mN·m).
(4) The white film according to any one of the above (1) to (3), wherein the white film is a monolayer film.
(5) The white film according to any one of the above (1) to (4), wherein the white film is composed of a composition containing a polyester resin (A) and an immiscible component (B), in which white film the voids are formed around the immiscible component (B).
(6) The white film according to any one of the above (1) to (5), which comprises a thermoplastic resin (B1) and an inorganic particle (B2) as the immiscible component (B).
(7) The white film according to the above (6), wherein the thermoplastic resin (B1) is a cyclic olefin copolymer resin (b1)) and the inorganic particle (B2) is titanium oxide (b2).
(8) The white film according to any one of the above (1) to (7), wherein the white film has a specific gravity of not greater than 1.2.

(9) The white film according to any one of the above (1) to (8), wherein the white film has a total light transmittance of not higher than 1.2.

(10) The white film according to any one of the above (1) to (9), wherein the white film has a thickness of 30 μm to 500 μm.

(11) A surface light source, which comprises the white film according to any one of the above (1) to (10) and a light source.

Effects of the Invention

Since the white film according to the present invention has a specific distribution in terms of the number of interfaces in the film thickness direction, even when it is made thin, a white film which has reflective properties, concealing properties, rigidity and film-forming stability at the same time can be obtained. In particular, when this white film is used as a reflection plate inside a surface light source, a liquid crystal display can be brightly illuminated and the liquid crystal images can be thus made more vivid and easier to see; therefore, this white film is useful.

BRIEF DESCRIPTION OF THE DRAWINGS

FIG. 1 is a SEM cross-sectional image of the vicinity of the surface of the white film according to the present invention.

MODE FOR CARRYING OUT THE INVENTION (1) White Film
(1.1) Constitution of White Film It is required that the white film according to the present invention contain voids inside thereof. By allowing the film to contain voids therein, a white film having excellent reflection characteristics can be easily produced as described later.

In the white film according to the present invention, the voids may exist individually or a plurality of voids may exist in series. The shape of the voids is not particularly restricted; however, in order to allow a large number of interfaces of the voids and resin to be exist in the film thickness direction, it is preferred that the voids have a circular cross-section or an elliptical cross-section elongated in the film surface direction.

As a method of forming the voids, a known method in the art can be employed. Examples thereof include (I) a method in which, after melt-extruding a mixture which contains a main resin component (for example, a polyester resin (A)) constituting the white film and a component (B) immiscible with the resin component, the resultant is stretched in at least one direction to form voids therein; (II) a method in which expandable particles are added and the resultant is melt-extruded to allow the particles to expand inside the film, thereby forming voids; (III) a method in which a gas such as carbon dioxide is injected and the resultant is extrude-foamed to form voids inside the film; (IV) a method in which at least two polymer components and an organic or inorganic material are mixed and melt-extruded and the resultant is then extracted with a solvent to dissolve at least one component to allow voids to be formed inside the film; (V) a method in which hollow particles are added and the resultant is melt-extruded to form voids; and (VI) a method in which a urethane resin for moisture-permeability processing or the like is coated on a substrate film and then dried to form a dry porous layer.

In the present invention, it is important that finer and flatter voids be generated; therefore, the above-described method (I) is preferably used. The method (I) utilizes detachment which occurs between the main resin component constituting the white film and the immiscible component during the stretching to generate flat voids. Therefore, when the method (I) is used, in order to increase the volume occupied by the voids as well as the number of interfaces per unit film thickness, biaxial stretching is more preferably used over uniaxial stretching.

In the followings, as a preferred example of the present invention, the method (I) is described in more detail.

The white film according to the present invention is required to contain voids therein and satisfy the following formulae (i) to (iii):

$$0.6 \leq nB/nA \leq 0.9 \quad \text{(i)}$$

$$20 \leq nA \quad \text{(ii)}$$

$$15 \leq nB \quad \text{(iii)}$$

(wherein, nA represents the number of interfaces in 10 μm of the surface layer in the film thickness direction; and nB represents the number of interfaces in ±5 μm of the central part in the film thickness direction).

In the white film according to the present invention, by satisfying the above-described formulae, the reflective properties and concealing properties of the white film can be drastically improved.

In the white film according to the present invention, the number of interfaces in 10 μm of the surface layer in the film thickness direction (nA) is required to be not less than 20, more preferably not less than 25, still more preferably not less than 30. The upper limit of the number of interfaces in 10 μm of the surface layer in the film thickness direction (nA) is not particularly restricted; however, from the standpoint of the film-forming stability, it is preferably not more than 50. When the number of interfaces in 10 μm of the surface layer in the film thickness direction (nA) is less than 20, the whiteness, light reflection characteristics and concealing properties may be poor.

Here, the term "10 μm of the surface layer in the film thickness direction" refers to a region within 10 μm from the surface of the white film in the thickness direction. In the present invention, at least either of the surface layer parts is required to satisfy the above-described relationships.

In the white film according to the present invention, the number of interfaces in ±5 μm of the central part in the film thickness direction (nB) is required to be not less than 15, more preferably not less than 20, still more preferably not less than 25. The upper limit of the number of interfaces in ±5 μm of the central part in the film thickness direction (nB) is not particularly restricted; however, from the standpoint of the film-forming stability, it is preferably not more than 50. When the number of interfaces in ±5 μm of the central part in the film thickness direction (nB) is less than 15, the whiteness, light reflection characteristics and concealing properties may be poor.

Here, the term "±5 μm of the central part in the film thickness direction" refers to a region within ±5 μm from the center of the white film in the thickness direction.

In order to control the nA and nB in the above-described ranges, for example, the followings can be done. That is, in cases where the above-described method (I) is used as a method of forming interfaces, for example, as described later, the type, content, particle size of the immiscible component (B) may be controlled. Specifically, it is preferred to use a thermoplastic resin (B1) and an inorganic particle (B2) as the immiscible component (B). In addition, it is preferred that the content of the thermoplastic resin (B1) be 3% by weight to 15% by weight and the volume average particle diameter (Dv) thereof be not larger 1.5 μm; and that the content of the inorganic particle (B2) be not less than 8% by weight and the average particle size thereof be not larger than 3 μm. By controlling the content and particle size of the immiscible component (B) in the above-described manner, a large number of voids having the immiscible component (B) as nucleus can be contained in the film (that is, voids can be formed around the immiscible component (B)). Also, the number of interfaces in 10 μm of the surface layer in the film thickness direction (nA) and the number of interfaces in ±5 μm of the central part in the film thickness direction (nB) can be easily controlled in the above-described ranges. By attaining such ranges, a large number of interfaces of the voids and the resin can be formed in the film thickness direction, so that the white film can have excellent whiteness, reflection characteristics and concealing properties. In addition, when the white film is integrated into a liquid crystal display device, the device can have excellent brightness characteristics.

Further, in the white film according to the present invention, the ratio of nB to nA (nB/nA) is required to be 0.6 to 0.9, more preferably 0.6 to 0.85, still more preferably 0.6 to 0.8. Having the ratio in the above-described range means that more interfaces are formed in 10 μm of the surface layer in the film thickness direction than in ±5 μm of the central part in the film thickness direction and by this, the reflective properties and concealing properties of the white film can be drastically improved. In order to attain the ratio nB/nA in the above-described range, for example, as described later, the output of an infrared heater at the time of longitudinal stretching can be controlled.

Further, in the white film according to the present invention, it is preferred that the void ratio in 10 μm of the surface layer in the film thickness direction (vA) and the void ratio in ±5 μm of the central part in the film thickness direction (vB) satisfy vB>vA. By satisfying the above-described relationship, a film having a higher rigidity than a film whose void ratio as a whole is vA can be obtained. It is noted here that, in the present invention, at least either of the surface layer parts is required to satisfy the above-described relationship.

Here, in order to attain the nA, nB and nB/nA in the above-described respective ranges and satisfy vB>vA at the same time, although it depends on the later-described constitution of the white film, for example, the followings can be done. In cases where the white film is a monolayer film, for example, as described later, in addition to controlling the output of an infrared heater at the time of longitudinal stretching, the roll preheating temperature at the time of longitudinal stretching (that is, the temperature at which the film is preheated by rolls provided in the upstream of the section where the film is actually stretched) may be controlled.

Specifically, as compared to the case of a conventional film having a constant void ratio in the film thickness direction, the preheating temperature at the time of longitudinal stretching may be lowered and to compensate this, in the downstream thereof, the film may be stretched while being heated by a high-power infrared heater. By doing so, since the temperature of the surface layer in the film thickness direction becomes higher than normal drawing temperature and the matrix is thus softened, the size of the voids generated in the vicinity of the surface layer and the void ratio (vA) are decreased and at the same time, the density of the number of interfaces (nA) is increased. Meanwhile, since the effect of the infrared heater is small in the central part of the film thickness direction, in contrast to the vicinity of the surface layer, the drawing temperature is about a normal drawing temperature, so that voids are easily formed and expanded into large voids, leading to an increase in the void ratio (vB) as well as a decrease in the density of the number of interfaces (nB). As a result, since there arises a difference in the void ratio and the density of the number of interfaces in the film thickness direction, interfaces can be generated such that nA is larger than nB, thereby the reflective properties and concealing properties of the white film can be drastically improved. Moreover, since the size of the voids in the surface layer in the film thickness direction and the void ratio are both small, the white film has high rigidity and even when it is a monolayer film, the surface layer functions as a support layer in a laminated film, so that the film-forming stability can also be improved.

Further, in cases where the white film is a laminated film, in addition to stretching it while heating with a high-power infrared heater at the time of longitudinal stretching, by laminating a layer having a different content or particle size of the immiscible component (B), the above-described relationships of nA, nB, vB and vA can be more likely to be satisfied. For example, in the case of a three-layer laminate (here, the middle layer of the three-layer laminate is referred to as "inner layer" and both surface layers are referred to as "outer layer"), by making the content of the immiscible component (B) in the outer layers higher than that in the inner layer, the outer layers are allowed to contain a larger number of voids having the immiscible component (B) as nucleus. Accordingly, nA can be made larger than nB, so that the reflective properties and concealing properties of the white film can be drastically improved.

The white film according to the present invention may be either a monolayer film or a laminated film as long as it contains voids therein. In cases where the white film is a monolayer film, it may be a film produced by using one extruder or it may also be a film produced by using two or more extruders to which materials having the same composition are fed. Meanwhile, in cases where the white film is a laminated film, in order to control nA, nB and the ratio nB/nA in the above-described ranges, it is preferred that the white film be a laminated film prepared by laminating a plurality of layers each having a different amount of voids contained therein. However, by preparing the white film in the form of a laminated film, the amounts of materials and utilities used are increased, leading to an increase in the environmental and cost burdens. In addition, the process becomes complex and has poor versatility, so that the laminated film can be produced only by limited devices. Therefore, in the present invention, it is preferred that the white film be a monolayer film.

It is noted here that the term "monolayer film" refers to a constitution in which the composition of the resin constituting the film and the inorganic particle (excluding those parts of voids) is uniform (same composition) in the thickness direction. Examples of a method of confirming that the constitution is uniform (same composition) include one in which the film is equally divided in the thickness direction into three regions and each region is then extracted with a solvent such as chloroform and precipitated to measure the mass, NMR and IR spectrum of the resulting substance. When there is no difference in terms of the compositions of the regions, it can be regarded that the three regions are of the same composition. In the present invention, even when the ratio and shape of the voids vary in the thickness direction and the film thus appear to have a plurality of layers at a glance, as long as the composition of the materials are the same, the film is regarded as a monolayer film.

The thickness of the white film according to the present invention is preferably 30 to 500 μm, more preferably 50 to 300 μm. When the thickness is less than 30 μm, it is difficult to ensure the flatness of the film, so that when the film is used as a surface light source, uneven brightness is likely to occur. On the other hand, in cases where the thickness is greater than 500 μm, when the film is used as a light reflecting film in a liquid crystal display or the like, the thickness of the liquid crystal display or the like may be too large.

Here, in order to control the thickness of the white film according to the present invention in the above-described range, for example, in the later-described production method, the amount of extrusion at the time of extrusion molding may be increased or the film-forming rate may be decreased.

(1.2) Main Resin Component Constituting the White Film

The resin used in the white film according to the present invention is not restricted; however, preferred examples thereof include thermoplastic resins such as polyester resins, polyolefin resins and polystyrene resins and the resin is more preferably a polyester resin. In particular, in cases where voids are formed inside the film by the above-described method (I), a polyester resin is preferred.

In the white film according to the present invention, the polyester resin (A) is a polymer obtained by polycondensation of a diol component and a dicarboxylic acid component. Representative examples of the dicarboxylic acid component include terephthalic acid, isophthalic acid, phthalic acid, 2,6-naphthalene dicarboxylic acid, adipic acid and sebacic acid. Further, representative examples of the diol component include ethylene glycol, trimethylene glycol, tetramethylene glycol and cyclohexane dimethanol. Specific examples of the polyester resin (A) include polyethylene terephthalate, polyethylene-2,6-naphthalene dicarboxylate (polyethylene naphthalate), polypropylene terephthalate and polybutylene terephthalate.

The polyester resin may be either a homopolyester or copolyester. As a copolymerizable component, for example, a diol component such as diethylene glycol, neopentyl glycol or polyalkylene glycol or a dicarboxylic acid component such as adipic acid, sebacic acid, phthalic acid, isophthalic acid, 2,6-naphthalene dicarboxylic acid or 5-sodium sulfoisophthalic acid may be used.

By using the above-described resin as the polyester resin (A), the resulting film can be provided with high mechanical strength while maintaining excellent colorlessness of the resin. More preferably, the polyester resin (A) is polyethylene terephthalate or polyethylene naphthalate since these resins are inexpensive and have excellent heat resistance.

The polyester resin (A) may be a mixture of a plurality of polyesters and may also contain a copolymerized polyester resin. Preferred examples of the copolymerized polyester include copolymerized polyester resins in which the diol component contains an alicyclic glycol as its major constituent; and those in which the dicarboxylic acid component is alicyclic dicarboxylic acid or isophthalic acid.

In particular, in cases where a cyclic olefin copolymer resin (b1) is used as the immiscible component (B), from the standpoints of the moldability and fine dispersion effect of the immiscible component (B), an amorphous copolymerized polyester in which cyclohexane dimethanol, which is an alicyclic glycol, is used as the diol component can be preferably employed. Further, the drawing properties and film-forming property can also be improved. It is preferred that the content of the cyclohexane dimethanol in the diol component be not less than 30 mol %. The reason why the immiscible component (B) is finely dispersed when such copolymerized polyester resin is used is because the interaction between the cyclic aliphatic hydrocarbon moiety of the copolymerized polyester resin and the cyclic olefin moiety of the later-described cyclic olefin copolymer resin (b1) makes the immiscible component (B) finely dispersible in the matrix. As a result, high reflective properties, high whiteness and light-weight properties can be achieved.

Here, taking the amount of all materials constituting the matrix as 100% by weight, the content of the copolymerized polyester is preferably 1% by weight to less than 50% by weight, more preferably 1.5% by weight to less than 40% by weight, still more preferably 1.5% by weight to less than 35% by weight. When the content of the copolymerized polyester is less than 1% by weight, it may become difficult to finely disperse the layer-described thermoplastic resin (B1) in the matrix. Further, in cases where the content of the copolymerized polyester exceeds 50% by weight, the heat resistance is impaired and when a heat treatment of the film is performed in order to impart thereto dimensional stability, the matrix is softened, so that voids may be reduced or eliminated, impairing the reflection characteristics. Moreover, when the heat treatment temperature is lowered in an attempt to maintain the reflection characteristics, the dimensional stability of the film may be decreased. By controlling the content of the copolymerized polyester with respect to 100% by weight of all materials constituting the matrix in the above-described range, the film-forming property and mechanical properties can be maintained while allowing the above-described dispersion effect of the immiscible component to be sufficiently exhibited. As a result, it becomes easier to attain both high reflectance and dimensional stability at the same time.

(1.3) Immiscible Component (B)

The immiscible component (B) to be used when forming voids inside the film by the above-described method (I) is not particularly restricted as long as it is immiscible with a matrix of the polyester resin (A) or the like, and a thermoplastic resin and an inorganic particle, which are immiscible with such matrix, may both be preferably used. The above-described components may be used individually or two or more thereof may be used in combination; however, it is one of more preferred embodiments of the white film according to the present invention to use a thermoplastic resin (B1) and an inorganic particle (B2), which are immiscible with the matrix, in combination as the immiscible component (B). It is preferred that a plurality of immiscible component (B)s be contained in the film since more voids can be formed and high reflective properties can be thus attained.

(1.3.1) Thermoplastic Resin (B1)

Here, in cases where a thermoplastic resin (B1) is used as the immiscible component (B), preferred examples of the thermoplastic resin (B1) include linear, branched or cyclic polyolefin-based resins such as polyethylene, polypropylene, polybutene, polymethylpentene and cyclopentadiene; acrylic resins such as poly(meth)acrylate; polystyrenes; and fluorine-based resins. These immiscible resins may be either a homopolymer or copolymer, and two or more of such immiscible resins may be used in combination as well. Thereamong, a polyolefin is preferably used because of its excellent transparency and heat resistance. Specifically, a polypropylene, polymethylpentene, cycloolefin copolymer or the like is preferably used.

The thermoplastic resin (B1) may be either a crystalline resin or an amorphous resin. As the crystalline resin, from the standpoint of the transparency and heat resistance, a polymethylpentene is more preferably used. Here, as the polymethylpentene, one which contains in the molecular skeleton a divalent organic groups derived from 4-methylpentene-1 as repeating units in an amount of preferably not less than 80 mol %, more preferably not less than 85 mol %, particularly preferably not less than 90 mol %, is preferred. Further, examples of other repeating units include divalent organic groups derived from $C_6$-$C_{12}$ hydrocarbons other than ethylene, propylene, butane-1,3-methylbutene-1 and 4-methylpentene-1. The polymethylpentene may be either a homopolymer or a copolymer. Further, a plurality of such polymethylpentenes having different compositions, melt viscosities and the like may be used as a mixture or the polymethylpentene may be used in combination with other olefin-based resin(s) or other resin(s).

Further, in cases where the thermoplastic resin (B1) is an amorphous resin, a cyclic olefin copolymer resin (b1) is particularly preferably used. The cyclic olefin copolymer is a copolymer composed of at least one cyclic olefin selected from the group consisting of cycloalkenes, bicycloalkenes, tricycloalkenes and tetracycloalkenes and a linear olefin such as ethylene or propylene.

Representative examples of the cyclic olefin in the cyclic olefin copolymer resin (b1) include bicyclo[2,2,1]hept-2-ene, 6-methylbicyclo[2,2,1]hept-2-ene, 5,6-dimethylbicyclo[2,2,1]hept-2-ene, 1-methylbicyclo[2,2,1]hept-2-ene, 6-ethylbicyclo[2,2,1]hept-2-ene, 6-n-butylbicyclo[2,2,1]hept-2-ene, 6-i-butylbicyclo[2,2,1]hept-2-ene, 7-methylbicyclo[2,2,1]hept-2-ene, tricyclo[4,3,0,1$^{2.5}$]-3-decene, 2-methyl-tricyclo[4,3,0,1$^{2.5}$]-3-decene, 5-methyl-tricyclo[4,3,0,1$^{2.5}$]-3-decene, tricyclo[4,4,0,1$^{2.5}$]-3-decene and 10-methyl-tricyclo[4,4,0,1$^{2.5}$]-3-decene.

Further, representative examples of the linear olefin in the cyclic olefin copolymer resin (b1) include ethylene, propylene, 1-butene, 1-pentene, 1-hexene, 1-octene, 1-decene, 1-dodecene, 1-tetradecene, 1-hexadecene and 1-octadecene.

As the thermoplastic resin (B1), among those examples described in the above, the cyclic olefin copolymer resin (b1), which is an amorphous resin, is particularly preferred. The cyclic olefin copolymer resin (b1) can be more finely dispersed by the interaction with the alicyclic diol and/or alicyclic dicarboxylic acid contained in the matrix and as a result, the reflection characteristics of the film can be further improved.

It is preferred that the cyclic olefin copolymer resin (b1) have a glass transition temperature (Tg) of not lower than 110° C. Specifically, the grass transition temperature (Tg) is preferably not lower than 130° C., more preferably not lower than 150° C., still more preferably not lower than 170° C. By controlling the grass transition temperature (Tg) in the above-described range, the cyclic olefin copolymer resin (b1) can be more finely dispersed in the matrix resin at the time of kneading and voids are more certainly formed in the stretching step, so that elimination of voids in the heat treatment step can be further inhibited. That is, if the glass transition temperature (Tg) is lower than 110° C., when a heat treatment of the film is performed in order to impart thereto dimensional stability, the cyclic olefin copolymer resin (b1), which is a nucleating agent, is deformed, so that the voids formed therearound may be reduced or eliminated, impairing the reflection characteristics. Moreover, when the heat treatment temperature is lowered in an attempt to maintain the reflection characteristics, the dimensional stability of the film may be decreased, which is not preferred. By controlling the glass transition temperature (Tg) at not lower than 110° C., both high reflectance and dimensional stability can be attained. Further, the upper limit of the glass transition temperature is preferably 250° C. A glass transition temperature of higher than 250° C. is not preferred since the extrusion temperature at the time of film formation becomes high, impairing the processability.

In order to control the glass transition temperature (Tg) in the above-described range, for example, in the cyclic olefin copolymer, the content of cyclic olefin component can be increased and that of linear olefin component such as ethylene can be reduced. Specifically, the content of cyclic olefin component and that of linear olefin component such as ethylene are preferably not less than 60 mol % and less than 40 mol %, more preferably not less than 70 mol % and less than 30 mol %, still more preferably not less than 80 mol % and less than 20 mol %, particularly preferably not less than 90 mol % and less than 10 mol %, respectively. By controlling the content of cyclic olefin component and that of linear olefin component such as ethylene in the above-described range, the glass transition temperature (Tg) of the cyclic olefin copolymer can be increased to the above-described range.

Further, in cases where the cyclic olefin copolymer resin (b1) is used, the linear olefin component is not particularly restricted; however, from the standpoint of the reactivity, it is preferably an ethylene component. The cyclic olefin component is also not particularly restricted; however, from the standpoints of the productivity and transparency as well as attaining a high Tg, it is preferably bicyclo[2,2,1]hept-2-ene (norbornene) or a derivative thereof.

The volume average particle diameter (Dv) of the cyclic olefin copolymer resin (b1) contained in the white film is preferably not greater than 1.5 μm, more preferably not greater than 1.4 μm, still more preferably not greater than 1.3 μm. When the volume average particle diameter (Dv) is greater than 1.5 μm, it is difficult to allow the white film to contain a large number of voids having the cyclic olefin copolymer resin (b1) as nucleus and coarse voids are formed, so that it is likely to become difficult to form a large number of interfaces of the voids and the resin in the film thickness direction. Consequently, the resulting white film has poor whiteness, reflection characteristics and lightweight properties and when it is integrated into a liquid crystal display device, the device has poor brightness characteristics, which is not preferred. By controlling the volume average particle diameter (Dv) at not greater than 1.5 μm, the white film can have excellent reflection characteristics.

In order to control the volume average particle diameter (Dv) of the cyclic olefin copolymer resin (b1) in the white film at not greater than 1.5 μm, as described later, a method in which a copolymerized polyester resin (C) and a dispersing agent (D) are added is preferably employed.

The content of the above-described thermoplastic resin (B1) is preferably 3 to 15% by weight, more preferably 4 to 10% by weight, still more preferably 5 to 10% by weight, with respect to 100% by weight of the total weight of all materials constituting the white film. When the content is less than 3% by weight, voids are not sufficiently formed in the film and the film may have poor whiteness and light reflection characteristics. On the other hand, when the content is greater than 15% by weight, the film strength is reduced, so that film breakage may become more likely to occur at the time of stretching. By controlling the content in the above-described range, the whiteness, reflective properties and lightweight properties can be sufficiently expressed.

(1.3.2) Inorganic Particle (B2)

In the white film according to the present invention, in cases where an inorganic particle (B2) is used as the immiscible component (B), examples thereof include glass, silica, barium sulfate, titanium oxide, magnesium sulfate, magnesium carbonate, calcium carbonate and talc.

Here, among these inorganic particles, particularly from the standpoint of comprehensive effects in void formation, whiteness, optical density and the like, titanium oxide, calcium carbonate or barium sulfate is more preferably employed and in particular, titanium oxide (b2) is most preferred.

In particular, it is preferred that the cyclic olefin copolymer resin (b1) and titanium oxide (b2) are used in combination as the immiscible component (B) since a higher reflectance and optical density can be simultaneously achieved because of the combination of light scattering provided by the titanium oxide particle and light diffusion provided by the voids.

The volume average particle size of the inorganic particle (B2) in the film is preferably 0.05 to 3 μm, more preferably 0.07 to 1 μm. When the volume average particle size of the inorganic particle (B2) is not in the above-described range, the gloss or smoothness of the film surface may be impaired because of a defect in the uniform dispersion of the inorganic particle (B2) caused by aggregation or the like or because of the particles themselves.

Taking the total weight of all materials constituting the white film as 100% by weight, the content of the inorganic particle (B2) is preferably 8 to 22% by weight, more preferably 12 to 18% by weight. When the content is less than 8% by weight, voids are not sufficiently formed in the film and the film may have poor whiteness and light reflection characteristics. On the other hand, when the content is greater than 22% by weight, the film strength is reduced, so that film breakage may become more likely to occur at the time of stretching. By controlling the content in the above-described range, the whiteness, reflective properties and lightweight properties can be sufficiently expressed.

(1.4) Other Additives

In the white film according to the present invention, in order to allow the thermoplastic resin (B1) to be more finely dispersed in the matrix, it is preferred that a dispersing agent (D) be further contained in the polyester resin (A). By adding the dispersing agent (D) to the polyester resin (A), the dispersion diameter of the thermoplastic resin (B1) can be further reduced and consequently, those flat voids produced by stretching can be made even finer, resulting in an improvement in the whiteness, reflective properties and lightweight properties of the film.

The type of the dispersing agent (D) is not particularly restricted, and for example, olefin-based polymers and copolymers which have a functional group reactive with a polar group, such as carboxyl group or epoxy group, or with polyester; diethylene glycols; polyalkylene glycols; surfactants; and thermal adhesive resins can be used. Needless to say, these dispersing agents may be used individually or two or more thereof may be used in combination.

Thereamong, a polyester-polyalkylene glycol block copolymer (D1) composed of a polyester segment and polyalkylene glycol segment is particularly preferred.

In this case, it is preferred that the polyester segment be a polyester composed of a $C_2$-$C_6$ aliphatic diol moiety and terephthalic acid and/or isophthalic acid moiety. Further, it is preferred that the polyalkylene glycol segment be, for example, polyethylene glycol, polypropylene glycol or polytetramethylene glycol.

A particularly preferred combination is one in which the polyester segment is a polyester having ethylene terephthalate units or butylene terephthalate units as repeating units and the polyalkylene glycol segment has ethylene glycol units or tetramethylene glycol units as repeating units. Thereamong, polybutylene terephthalate-polytetramethylene glycol copolymer or polyethylene terephthalate-polyethylene glycol copolymer is particularly preferred.

The content of the dispersing agent (D) is not particularly restricted; however, taking the amount of all materials constituting the matrix as 100% by weight, it is preferably 0.1 to 30% by weight, more preferably 1 to 25% by weight, still more preferably 1.5 to 20% by weight. A content of less than 0.1% by weight is not preferred since the effect of refining the voids may be small. Further, in cases where the content is greater than 30% by weight, the heat resistance is impaired and when a heat treatment of the film is performed in order to impart thereto dimensional stability, the matrix is softened, so that voids may be reduced or eliminated, impairing the reflection characteristics. Moreover, when the heat treatment temperature is lowered in an attempt to maintain the reflection characteristics, the dimensional stability of the film may be decreased, which is not preferred. Furthermore, a content of greater than 30% by weight is not preferred since there may arise problems of, for example, a decrease in the production stability and an increase in the cost. By controlling the content of the dispersing agent (D) with respect to the whole matrix components in the above-described range, the film-forming property and mechanical properties can be maintained while allowing the above-described dispersion effect of the thermoplastic resin (B1) to be sufficiently exhibited. As a result, it becomes easier to attain both high reflectance and dimensional stability at the same time.

It is note here that, in the white film according to the present invention, an appropriate additive(s) such as heat resistant stabilizer, oxidation resistant stabilizer, ultraviolet absorber, ultraviolet stabilizer, organic lubricant, organic particulate, filler, nucleating agent, dye, dispersing agent and coupling agent may be blended as required in an amount which does not impair the effects of the present invention.

(2) Film Characteristics

The white film according to the present invention has the above-described constitution and the total light transmittance of the white film is preferably not higher than 1.2%, more preferably not higher than 1.05%, still more preferably not higher than 0.9%. The term "transmittance" used herein refers to a value measured in accordance with JIS K7361-1 (1997). By controlling the transmittance at not higher than 1.2%, penetration of light to the back side of the film can be inhibited. As a result, the white film can have excellent whiteness, reflection characteristics and concealing properties, so that particularly when it is used in a liquid crystal display device, a high brightness-improving effect can be attained. Here, the lower limit of the transmittance is preferably 0% and as a practical value, it is preferably 0.001%. Specifically, for example, a shadow created by the shape of the chassis of the backlight unit arranged in the further back of the reflection film (the white film according to the present invention) is preferably not visible.

Further, the white film according to the present invention has a relative reflectance of not lower than 100%, more preferably not lower than 100.5%, still more preferably not lower than 101%. The term "relative reflectance" used herein refers to a value obtained by measuring the reflectance using a spectrophotometer equipped with an integrating sphere whose inner surface is made of barium sulfate and a 10° angle spacer and aluminum oxide as standard white plate when the film is irradiated with a light having a wavelength of 560 nm at an incidence angle of 10° and then calculating the average relative reflectance, taking the reflectance of the standard white plate as 100%. In the white film according to the present invention, by controlling the relative reflectance at not lower than 100%, the white film can have excellent whiteness and reflection characteristics, so that particularly when it is used in a liquid crystal display device, a high brightness-improving effect can be attained.

Here, the total light transmittance and relative reflectance of the white film according to the present invention can be attained in the above-described ranges by, for example, 1) controlling the dispersion diameter and density of the resin particles in the film to control the nA, nB, nB/nA, vA and vB in the above-described ranges; or 2) increasing the film thickness. In conventional white films, for adjusting the relative reflectance to the above-described range, only the above-described method 2) was available. However, in the present invention, by controlling the dispersion diameter and density of the resin particles in the film in the above-described ranges, a thinner white film having high concealing performance and high reflection performance, which could not be achieved in conventional white films, can be obtained.

Specifically, the white film according to the present invention satisfies the above-described transmittance and reflectance at a thickness of preferably not greater than 300 μm, more preferably not greater than 250 μm, still more preferably not greater than 188 μm. According to the present invention, the above-described transmittance and reflectance can be satisfied at such a thickness, that is, a white film having high reflection performance can be obtained at a smaller thickness as compared to conventional ones. As a result, when the white film is used as, for example, a reflective member of a liquid crystal display, a high brightness-improving effect can be achieved and at the same time, the display can be made thin.

Further, it is preferred that the white film according to the present invention have a flexural rigidity of not less than 1.1 (mN·m). The term "flexural rigidity" used herein refers to a value obtained by dividing the rigidity indicated by the bending moment according to JIS P8125 (2000) by cube of thickness (μm), and by multiplying the resulting value by cube of thickness of common film (188 μm), that is, a value converted in terms of a thickness of 188 μm. The flexural rigidity is more preferably not less than 1.2 (mN·m). For example, in cases where the white film according to the present invention is used as a reflection plate of a backlight, since a stress is applied by the film's own weight to the part thereof held during product assembly, creases are likely to occur. However, by controlling the flexural rigidity in the above-described range, since creases are not likely to occur even during the assembly of the backlight, such film is easy to handle. Therefore, also in products such as backlights, irregular brightness can be more certainly prevented. From the standpoint of retaining some flexibility, the upper limit of the flexural rigidity is preferably not higher than 30 (mN·m).

The flexural rigidity of the white film according to the present invention can be attained in the above-described range by, for example, 1) controlling the dispersion diameter and density of the resin particles in the film to control the nA, nB, nB/nA, vA and vB in the above-described ranges; 2) lowering the void ratio of the film to increase the density; or 3) laminating a resin layer having no void on the surface layer. In conventional white films, for adjusting the flexural rigidity to the above-described range, only the above-described methods 2) and 3) were available, and by these methods, high reflection performance cannot be attained. However, in the present invention, by controlling the dispersion diameter and density of the resin particles in the film in the above-described ranges, a white film having a high flexural rigidity and high reflection performance, which could not be achieved in conventional white films, can be obtained.

Further, it is preferred that the white film according to the present invention have a specific gravity of not greater than 1.2. The term "specific gravity" used herein refers to a value obtained in accordance with JIS K7112 (1980). The specific gravity is more preferably not greater than 1.0, still more preferably not greater than 0.9. When the specific gravity is greater than 1.2, the void ratio is too low and the reflectance is thus reduced, so that the brightness tends to be insufficient when the film is used as a reflection plate of a surface light source; therefore, such a specific gravity is not preferred. The lower limit of the specific gravity is preferably not less than 0.3, more preferably not less than 0.4. When the specific gravity is less than 0.3, the flexural rigidity is insufficient as a film and there may arise problems that, for example, the film is easily broken and has poor handling property.

The specific gravity of the white film according to the present invention can be attained in the above-described range by controlling the dispersion diameter and density of the resin particles in the film as well as the drawing ratio at the time of film formation.

(3) Production Method

The method of producing the white film according to the present invention will now be described by way of an example thereof; however, the present invention is not restricted thereto.

The white film according to the present invention can be produce, for example, by the above-described method (I). In this method, a mixture which contains at least a resin serving as matrix, such as the polyester resin (A), and the immiscible component (B) is sufficiently vacuum-dried as required and then fed to a heated extruder (main extruder) of a film-forming apparatus to be melt-extruded. The addition of the immiscible component (B) may be performed by, for example, using a master chip prepared in advance by uniformly melt-kneading and blending the immiscible component (B) or by directly supplying the immiscible component (B) to a kneading extruder. However, from the viewpoint that dispersion of the immiscible component (B) is facilitated, it is more preferred to use a master chip prepared in advance by uniformly melt-kneading a mixture containing a resin serving as matrix, such as the polyester resin (A), and the immiscible component (B). As for the melt-extrusion, it is preferred that the above-described mixture be filtered through a filter having a mesh size of not larger than 40 μm and then introduced into a T-die mouthpiece from which the mixture is then extruded and molded into a molten sheet. The thus obtained molten sheet is electrostatically adhered, cooled and solidified on a drum cooled to have a surface temperature of 10 to 60° C., thereby preparing an unstretched film.

Thereafter, the thus obtained unstretched film is introduced to a stretching step. Here, in order to obtain the white film according to the present invention, for example, in addition to controlling the output of an infrared heater at the time of longitudinal stretching, it is preferred to control the roll preheating temperature at the time of longitudinal stretching (that is, the temperature at which the film is preheated by rolls provided in the upstream of the section where the film is actually stretched). In other words, the unstretched film is introduced to rolls heated to a temperature of, for example, 60 to 85° C. and stretched in the machine direction (longitudinal direction, that is, the moving direction of the film) between two rolls having different circumferential speed. The roll preheating temperature at the time of longitudinal stretching is more preferably 65 to 80° C., still more preferably 68° C. to 75° C. A roll preheating temperature of higher than 85° C. is not preferred since voids are not easily formed in the film and the reflectance is reduced. Further, during this stretching, it is preferred that the surface of the film be heated with an amount of heat (Q) of 8.5 W/cm to 40 W/cm, more preferably 10 W/cm to 25 W/cm. The term "amount of heat (Q)" used in the present invention refers to an amount of heat per unit film width.

As a heat source for heating the film in the section where the film is actually stretched, an infrared heater or heated air can be used; however, from the standpoint of the energy efficiency, it is preferred to use an infrared heater. The type of the infrared heater is not particularly restricted, and for example, a near-infrared heater or a carbon heater can be used. From the standpoint of the balance between the heating performance and the service life, a carbon heater is more preferred. It is preferred that the infrared heater be provided with a gold reflective film on the back surface. Further, a light condenser may also be used. Examples of such heater include Twin Tube Transparent Quartz Glass Carbon Heater manufactured by Heraeus K.K.

The distance between the infrared heater and the film is preferably 10 to 50 mm, more preferably 10 to 20 mm. When the distance between the infrared heater and the film is 50 mm or greater, in the later-described output range of the infrared heater, the infrared radiation is attenuated before reaching the film, so that the surface temperature of the film may not be increased. When the distance between the infrared heater and the film is shorter than 10 mm, in the above-described output range of the infrared heater, the film is softened at the time of longitudinal stretching, so that stable film formation cannot be attained, which is not preferred.

The output of the infrared heater is preferably 30 to 150 W/cm, more preferably 40 to 100 W/cm, still more preferably 45 to 80 W/cm. When the output of the infrared heater at the time of longitudinal stretching is higher than 150 W/cm, the film is softened at the time of longitudinal stretching, so that stable film formation cannot be attained, which is not preferred. Further, when the output of the infrared heater at the time of longitudinal stretching is lower than 30 W/cm, interfaces may not be generated in such a manner that the number of interfaces in the surface layer part in the film thickness direction is greater than the number of interfaces in the central part in the film thickness direction; therefore, such an output is not preferred. In addition, since craters are formed on the film surface, process contamination by powder generation or the like and impairment of the handling properties in the post-processing may occur; therefore, an output of lower than 30 W/cm is not preferred.

In the present invention, in cases where an infrared heater is used, the amount of heat (Q) thereof refers to a value determined by the following formula. Further, the amount of heat (Q) is expressed in terms of the amount of heat per surface.

$$Q=(\text{output of the infrared heater (W/cm)})\times(0.4-0.055\times\ln(\text{distance between the infrared heater and the film (mm)}))$$

The number of the infrared heaters is not particularly restricted and one or a plurality of infrared heaters may be used; however, the time for the film to pass through the irradiation zone is preferably 0.2 to 2 seconds, more preferably 0.4 to 1 second. When the film-forming rate is slow, only one infrared heater may be used; however, when the film-forming rate is fast, it is preferred to arrange a plurality of infrared heaters. The upper limit of the number of the infrared heaters is not particularly prescribed; however, based on the spaces between the rolls, the upper limit is actually 4. The "irradiation zone" used in the present invention is 40 mm per heater and the term refers to a distance excluding overlaps. When the time for the film to pass through the irradiation zone is shorter than 0.2 second, the film is not sufficiently heated, while when it is longer than 2 seconds, the temperature of inside the film becomes high, reducing the reflectance, which are not preferred.

Further, the infrared heater(s) is/are arranged on one side or both sides of the film. Particularly, it is desired that the infrared heater(s) be arranged on the side of the layer having voids.

According to the above-described method, by heating the surface of the film during stretching, the drawing tension at the surface is reduced, so that formation of voids can be inhibited. At the same time, since the thermal conductivity is decreased by the voids being formed by the preheating from the upstream, the temperature of inside the film becomes lower than that of the surface. Consequently, by the stretching, voids are more likely to be formed inside the film than on the film surface, thereby a film having the above-described constitution of the present invention can be produced. FIG. 1 shows a SEM image of the cross-section of the film having the present constitution. Therefore, it is vital to heat the film during stretching.

In the above-described method, the film is stretched in the longitudinal direction at a drawing ratio of 3.4 to 4.5 times with heating and the resulting film is then cooled by rolls having a temperature of 20 to 50° C. When the drawing ratio is less than 3.4 times, voids of sufficient size are not likely to be formed, making it to difficult to attain a sufficient reflectance. Further, it is not preferred to stretch the film at a drawing ratio of greater than 4.5 times since the film is easily broken in the subsequent transversal stretching, making the productivity poor.

Thereafter, while holding both ends of the resulting film with a clip, the film is introduced to a tenter and stretched at a drawing ratio of 3 to 5 times in the direction (width direction) perpendicular to the machine direction under an atmosphere heated to a temperature of 90 to 150° C. When the drawing ratio is less than 3 times, the size of the voids is likely to be reduced, making it to difficult to attain a sufficient reflectance. Further, it is not preferred to stretch the film at a drawing ratio of greater than 5 times since the film becomes easily broken, making the productivity poor.

In order to complete the oriented crystallization of the thus obtained biaxially stretched film and impart thereto flatness and dimensional stability, the film is continuously subjected to a heat treatment at a temperature of 150 to 240° C. for 1 to 30 seconds in the tenter. In this case, as required, the film may also be subjected to a 3 to 12% relaxation treatment in the width or longitudinal direction. Thereafter, the film is allowed to uniformly cool to room temperature and as required, in order to further improve the adhesion with other materials, the film may be subjected to a corona discharge treatment or the like being rolled up. In this manner, the white film according to the present invention can be obtained.

Here, in order to improve the thermal dimensional stability, it is preferred that the white film according to the present invention be subjected to a heat treatment at a high temperature in the film-forming step. The heat treatment temperature is preferably 180° C. to 240° C., more preferably 190° C. to 230° C. In cases where the white film according to the present invention is used as, for example, a reflection film of a surface light source (backlight) installed in a liquid crystal display or the like, depending on the backlight, the temperature of the atmosphere therein may be increased to about 100° C. Therefore, it is desired that the white film according to the present invention also have a certain level of thermal dimensional stability.

(4) Surface Light Source

The above-described white film is suitably used in a backlight (surface light source) of a liquid crystal display or the like. As the backlight, an edge-type and direct-type are available, and the white film according to the present invention is applicable to both types.

In a chassis of an edge-type backlight, the white film according to the present invention and a light guide plate are integrated in this order and the white film is integrated such that the surface having the above-described nA faces the light guide plate. In the front side of the light guide plate (the opposite side of the white film), a plurality of diffuser panels and prisms may be arranged as well. Further, in the edge part of the light guide plate, a light source such as cold cathode fluorescent lamp or LED is provided.

Meanwhile, in a chassis of a direct-type backlight, the white film according to the present invention and a light source such as cold cathode fluorescent lamp are arranged in this order and the white film is arranged such that the surface having the above-described nA faces the surface light source. In the front side of the light source (the opposite side of the white film), a plurality of diffuser panels and prisms may be arranged as well.

EXAMPLES

The present invention will now be described more specifically by way of examples thereof; however, the interpretation of the present invention should not be restricted thereto.
(Measurement Method)
A. The Number of Void-resin Interfaces Inside Film A cross-section was cut out in the direction parallel to the film TD direction (transverse direction) using a microtome and platinum-palladium was deposited thereon. Then, the resultant was observed at an appropriate magnification (×500 to ×10,000) under a field emission scanning electron microscope "JSM-6700F" manufactured by JEOL Ltd. On the thus obtained image, a straight line was arbitrarily drawn perpendicular to the film surface from one side of the film surface to the other to determine the number of interfaces present on the line. Here, in the measurement of the number of interfaces, an interface from a gas phase to a solid phase and an interface from a solid phase to a gas phase are both counted as one interface. An interface formed by a void produced by the thermoplastic resin (B1) and an interface formed by a void produced by the inorganic particle (B2) were also counted as one interface. The number of measurements was 5 (n=5) and the average thereof was calculated. Here, the number of interfaces in 10 µm of the surface layer in the film thickness direction was defined as nA and the number of interfaces in ±5 µm of the central part in the film thickness direction was defined as nB.

The number of interfaces in 10 µm of the surface layer in the film thickness direction (nA) was evaluated as:
"A" when it was 30 or more;
"B" when it was not less than 25 but less than 30;
"C" when it was not less than 20 but less than 25; and
"D" when it was less than 20.

The number of interfaces in ±5 µm of the central part in the film thickness direction (nB) was evaluated as:
"A" when it was 25 or more;
"B" when it was not less than 20 but less than 25;
"C" when it was not less than 15 but less than 20; and
"D" when it was less than 15.

Further, the ratio (nB/nA) of the number of interfaces in ±5 µm of the central part in the film thickness direction (nB) to the number of interfaces in 10 µm of the surface layer in the film thickness direction (nA) was evaluated as:
"A" when it was not less than 0.6 but less than 0.8;
"B" when it was not less than 0.8 but less than 0.9; and
"C" when it was 0.9 or higher.
B. Relative Reflectance A φ60 integrating sphere 130-0632 (Hitachi, Ltd.) (inner surface is made of barium sulfate) and a 10° angle spacer were installed in a spectrophotometer U-3410 (Hitachi, Ltd.) to measure the optical reflectance at 560 nm. Here, the optical reflectance was measured for both surfaces of white film and the higher value was defined as the reflectance of the white film. Five white films were prepared and their average reflectance was defined as the relative reflectance. As a standard white plate, the product number 210-0740 (aluminum oxide) manufactured by Hitachi Instruments Service Co., Ltd. was used. The relative reflectance was evaluated as:
"A" when it was 101% or higher;
"B" when it was not lower than 100.5% but lower than 101%;
"C" when it was not lower than 100% but lower than 100.5%; and
"D" when it was lower than 100%.
C. Total Light Transmittance The total light transmittance in the film thickness direction was measured using a haze meter NDH-5000 (manufactured by Nippon Denshoku Industries Co., Ltd.). Here, the transmittance was measured for both surfaces of white film and the lower value was defined as the transmittance of the white film. Five white films were prepared and their average transmittance was defined as the total light transmittance. The total light transmittance was evaluated as:
"A" when it was 0.90% or lower;
"B" when it was higher than 0.90% but not higher than 1.05%;
"C" when it was higher than 1.05% but not higher than 1.20%; and
"D" when it was higher than 1.20%.
D. Specific Gravity A white film was cut out into a size of 5 cm×5 cm and measured in accordance with JIS K7112 (1980) using an electronic densitometer SD-120L (manufactured by Mirage Trading Co., Ltd.). Here, 5 samples were prepared for each white film and subjected to the measurement, and their average value was defined as the specific gravity of the white film.

The specific gravity was evaluated as:
"A" when it was 0.9 or lower;
"B" when it was higher than 0.9 but not higher than 1.0;
"C" when it was higher than 1.0 but not higher than 1.2; and
"D" when it was higher than 1.2.
E. Film-forming Property During the film formation in Examples and Comparative Examples, the film-forming property was evaluated as "A" when film breakage hardly occurred (less than 1 breakage during a 24-hour film formation); "B" when film breakage slightly occurred (1 to less than 3 times during a 24-hour film formation); "C" when some film breakages occurred (3 to less than 5 times during a 24-hour film formation); and "D" when film breakage occurred frequently (not less than 5 times during a 24-hour film formation). For large-scale production, the film-forming property needs to be "B" or better and when the film-forming property is "A", there is a cost-reducing effect.
F. Flexural Rigidity The flexural rigidity was defined as a value obtained by calculating the rigidity indicated by the bending moment according to JIS P8125 (2000) in terms of a thickness of 188 µm. Here, 5 samples were prepared for each white film and subjected to the measurement, and their average value was defined as the flexural rigidity of the white film. For the measurement, a taber-type stiffness tester Teledyne Taber Model 150-D (manufactured by Teledyne, North Tonawanda, N.Y., USA) was used.

$$\text{Flexural rigidity}(mN \cdot m) = B(mN \cdot m) \times (188(mN \cdot m))^3 / (\text{film thickness}(\mu m))^3$$

G. Void Ratio

A film cross-section was cut out in the direction parallel to the width direction of white film using a microtome and platinum-palladium was deposited thereon. Then, the subject region was observed under a field emission scanning electron microscope "JSM-6700F" manufactured by JEOL Ltd. at an arbitrary magnification of ×2,000 to ×3,000 and a photograph of the cross-section was taken. A transparent film or sheet was laminated on the thus obtained cross-sectional image and the parts corresponding to voids were painted with an oil-based ink or the like. Thereafter, using an image analyzer (manufactured by Nireco Corporation; "Luzex" (registered trademark) IID), the void area ratio (%) in the region was determined and the thus obtained value was defined as the void ratio. In this case, particles are not included in those parts corresponding to voids. Here, 5 samples were prepared for each white film and subjected to the measurement, and their average value was defined as the void ratio of the white film.

The relationship between the void ratio (%) in 10 μm of the surface layer in the film thickness direction (vA) and the void ratio (%) in ±5 μm of the central part in the film thickness direction (vB) was evaluated as:

"A" when vB>vA; and
"B" when vB≤vA.

H. Crease Resistance

A film sample is cut into a size of 30 cm×30 cm and the center of an arbitrary end thereof is chucked at a size of 1.5 cm×1.5 cm. The film sample is placed such that the chuck surface is leveled and the film hangs down with its own weight. The chuck is then released to visually verify if a crease of not shorter than 1 mm in length was formed on the film. The same procedures were performed for 12 film samples and the crease resistance was evaluated as:

"A" when such crease was formed on 0 out of the 12 films;
"B" when such crease was formed on 1 to 3 of the 12 films; and
"C" when such crease was formed on 4 to 12 of the 12 films.

It is noted here that this test is a model test simulating the crease occurrence of the white film (occurrence of defective films) at the time of assembly of a backlight unit. The smaller the number of films having a crease formed thereon in the present test, the lower the crease occurrence of the white film at the time of assembly of a backlight unit.

(Materials)
Polyester Resin (A)

A polyethylene pellet was prepared using terephthalic acid as an acid component and ethylene glycol as a glycol component and antimony trioxide (polymerization catalyst) was added thereto in an amount of 300 ppm in terms of the amount of antimony atoms to perform a polycondensation reaction, thereby obtaining a polyethylene terephthalate (PET) pellet having a limiting viscosity of 0.63 dl/g and 40 eq/ton of terminal carboxyl group. The crystal melting heat thereof was measured by a differential thermal analyzer to be not less than 1 cal/g; therefore, the thus obtained polyethylene terephthalate was a crystalline polyester resin. The melting point (Tm) of this resin was measured to be 250° C.

Cyclic Olefin Copolymer Resin (b1)

A cyclic olefin resin "TOPAS" (manufactured by Polyplastics Co., Ltd.), which has a glass transition temperature of 178° C. and a MVR (260° C./2.16 kg) of 4.5 ml/10 min, was used. It is noted here that, since the crystal melting heat thereof was measured by a differential thermal analyzer to be less than 1 cal/g, the cyclic olefin resin was an amorphous resin.

Copolymerized Polyester Resin (C1)

A CHDM (cyclohexane dimethanol)-copolymerized PET was used. This is a PET obtained by copolymerizing the above-described copolymerized glycol component with cyclohexane dimethanol in an amount of 30 mol %. The crystal melting heat thereof was measured by a differential thermal analyzer to be less than 1 cal/g; therefore, this CHDM-copolymerized PET was an amorphous resin.

Copolymerized Polyester Resin (C2)

A CHDM (cyclohexane dimethanol)-copolymerized PET was used. This is a PET obtained by copolymerizing the above-described copolymerized glycol component with cyclohexane dimethanol in an amount of 60 mol %. The crystal melting heat thereof was measured by a differential thermal analyzer to be less than 1 cal/g; therefore, this CHDM-copolymerized PET was an amorphous resin.

Copolymerized Polyester Resin (C3)

An isophthalic acid-copolymerized PET was used. This is a PET obtained by copolymerizing isophthalic acid as a dicarboxylic acid component in an amount of 17.5 mol %. The isophthalic acid-copolymerized PET was measured by a differential thermal analyzer to have a crystal melting heat of less than 1 cal/g, showing amorphous character.

Dispersing Agent (D)

A PBT-PAG (polybutylene terephthalate-polyalkylene glycol) block copolymer (D1) was used. This resin is a block copolymer between PBT and PAG (mainly polytetramethylene glycol). Its crystal melting heat was measured by a differential thermal analyzer to be not less than 1 cal/g; therefore, the PBT-PAG block copolymer was a crystalline polyester resin.

Example 1

A mixture of the materials shown in Table 1 was vacuum-dried at 180° C. for 3 hours and then fed to an extruder to be melt-extruded at 280° C. The resultant was filtered through a 30-μm cut filter before being introduced to a T-die mouthpiece.

Thereafter, the resultant was extruded from the T-die mouthpiece into the form of a sheet to obtain a molten monolayer sheet, which was then adhered, cooled and solidified by electro-pinning on a drum whose surface temperature was maintained at 25° C. to obtain an unstretched monolayer film. Subsequently, after preheating the thus obtained unstretched monolayer film with rolls heated to a temperature of 70° C., while irradiating both surfaces of the film with an infrared heater under the conditions shown in Table 2, the thus preheated unstretched monolayer film was stretched in the machine direction (longitudinal direction) at a drawing ratio of 3.6 times. The resulting film was then cooled with rolls having a temperature of 25° C. to obtain a uniaxially stretched film.

While holding both ends with a clip, the thus obtained uniaxially stretched film was introduced to a preheating zone having a temperature of 95° C. inside a tenter and then continuously stretched in a heating zone having a temperature of 105° C. in the direction (width direction) perpendicular to the machine direction at a drawing ratio of 3.6 times. Subsequently, in a heat treatment zone inside the tenter, the resulting film was further subjected to a heat treatment at 190° C. for 20 seconds, a 6% relaxation treatment at 180° C. in the width direction, and then a 1% relaxation treatment at 140° C. in the width direction. Thereafter, after allowing the resulting film to cool uniformly, the film was rolled up to obtain a monolayer white film of 188 μm in thickness.

The film-forming property was good. When the cross-section of the thus obtained white film was observed, it was found that the white film contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the film. The thus obtained white film had excellent reflective properties and concealing properties.

Examples 2 and 3

A monolayer white film of 188 μm in thickness was obtained in the same manner as in Example 1 except that the conditions of the infrared heater were changed as shown in Table 2. The film-forming property was good in both Examples 2 and 3. When the cross-sections of the thus obtained white films were observed, it was found that the white films both contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. The thus obtained white films had excellent reflective properties and concealing properties in the same manner as the white film of Example 1.

Examples 4 and 6

A monolayer white film of 188 μm in thickness was obtained in the same manner as in Example 1 except that the material composition was changed as shown in Table 1. The film-forming property was good in both Examples 4 and 6. When the cross-sections of the thus obtained white films were observed, it was found that the white films both contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. The thus obtained white films had excellent reflective properties and concealing properties although they were not as good as those of the white film obtained in Example 1.

Examples 5 and 7

A monolayer white film of 188 μm in thickness was obtained in the same manner as in Example 1 except that the material composition was changed as shown in Table 1. The film-forming property was generally good although it was slightly inferior as compared to Example 1. When the cross-sections of the thus obtained white films were observed, it was found that the white films both contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. The thus obtained white films had excellent reflective properties and concealing properties. In particular, the white film obtained in Example 5 had excellent reflective properties and the one obtained in Example 7 had excellent concealing properties.

Examples 8, 9, 10 and 11

A monolayer white film of 188 μm in thickness was obtained in the same manner as in Example 1 except that the material composition was changed as shown in Table 1. The film-forming property was good in all of these Examples. When the cross-sections of the thus obtained white films were observed, it was found that all of the white films contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. The thus obtained white films had superior reflective properties and concealing properties as compared to the white film obtained in Example 1.

Example 12

A mixture having the material composition shown in Table 1 was vacuum-dried at 160° C. for 3 hours and then fed to an extruder (A). The barium sulfate particle used here had a particle size of 1.2 μm. In addition, the polyester resin (A) was separately dried at 180° C. for 3 hours and then fed to an extruder (B). The materials fed to the extruders (A) and (B) were each melted at a temperature of 280° C. before being fed to a feedblock. In the feedblock, a layer composed of the materials fed to the extruder (A) (layer A) and a layer composed of the material fed to the extruder (B) (layer B) were laminated in the thickness direction to obtain a two-layer laminate of the layers A and B, which was then introduced to a T-die mouthpiece.

Thereafter, the laminate was extruded from the T-die mouthpiece into the form of a sheet to obtain a molten unstretched two-layer laminated sheet composed of the layers A and B. The thus obtained molten laminated sheet was adhered, cooled and solidified by electro-pinning on a drum whose surface temperature was maintained at 25° C. to obtain an unstretched laminated film. Here, the surface of the layer B was in contact with the drum, while the surface of the layer A was in contact with the air. That is, the surface of the layer B constituted the bottom surface of the film and the surface of the layer A constituted the top surface of the film.

Subsequently, after preheating the thus obtained unstretched laminated film with rolls heated to a temperature of 85° C., while irradiating only the surface of the layer A (top surface of the film) with an infrared heater under the conditions shown in Table 2, the thus preheated unstretched laminated film was stretched in the machine direction at a drawing ratio of 3.6 times with utilization of the difference in the circumferential speed of the rolls. The resulting film was then cooled with rolls having a temperature of 25° C. to obtain a uniaxially stretched film.

While holding both ends with a clip, the thus obtained uniaxially stretched film was introduced to a preheating zone having a temperature of 95° C. inside a tenter and then continuously stretched in a heating zone having a temperature of 105° C. in the direction (film width direction) perpendicular to the film machine direction at a drawing ratio of 3.6 times. Subsequently, in a heat treatment zone inside the tenter, the resulting film was further subjected to a heat treatment at 190° C. for 20 seconds, a 6% relaxation treatment at 180° C. in the width direction, and then a 1% relaxation treatment at 140° C. in the width direction. Then, after allowing the resulting film to cool uniformly, the film was rolled up. In this manner, a laminated white film of 188 μm in thickness was obtained.

The content of the barium sulfate particle in the thus obtained white film was 22% by weight with respect to the whole white film. Further, when the cross-section of this white film was observed, it was found that a large number of minute voids were contained in the layer A and that the layers A and B had a thickness of 168 μm and 20 μm, respectively. The thus obtained white film had a higher reflectance on the layer A side. The number of interfaces in 10 μm of the surface layer on the layer A side (nA), the number of interfaces in ±5 μm of the central part in the film thickness direction (nB) and the ratio thereof are shown in Table 3. There was no void in 10 μm of the surface layer on the layer B side. The thus obtained white film had excellent reflective properties and concealing properties although they were not as good as those of the white film obtained in Example 1.

Comparative Examples 1 and 2

A monolayer white film of 188 μm in thickness was obtained in the same manner as in Example 1 except that the conditions of the infrared heater were changed as shown in Table 2. The film-forming property was inferior in these Comparative Examples as compared to Example 1. When the cross-sections of the thus obtained white films were observed, it was found that the white films both contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. However, in these Comparative Examples, the ratio nB/nA was large; therefore, the concealing properties of these white films was inferior as compared to the white film of Example 1.

Comparative Example 3

Film-forming procedures were performed in the same manner as in Example 1 except that the conditions of the infrared heater were changed as shown in Table 2; however, the film was thermally deformed during the stretching in the machine direction (longitudinal direction), so that a film could not be obtained.

Comparative Examples 4, 6, 8 and 10

A monolayer white film of 188 μm in thickness was obtained in the same manner as in Example 1 except that the material composition was changed as shown in Table 1. The film-forming property was good in all of these Comparative Examples. When the cross-sections of the thus obtained white films were observed, it was found that all of the white films contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the films. However, in these Comparative Examples, the nA or both of the nA and nB was/were small; therefore, the reflective properties and concealing properties of these white films were largely inferior as compared to the white film of Example 1.

Comparative Examples 5, 7 and 9

Film-forming procedures were performed in the same manner as in Example 1 except that the material composition was changed as shown in Table 1; however, film breakage occurred frequently during the stretching, so that a film could not be obtained.

Comparative Example 11

A monolayer white film of 188 μm in thickness was obtained in the same manner as in Example 1 except that the preheating roll temperature was changed as shown in Table 2. The film-forming property was good. When the cross-section of the thus obtained white film was observed, it was found that the white film contained a large number of minute voids therein. The number of interfaces in 10 μm of the surface layer in the film thickness direction (nA), the number of interfaces in ±5 μm of the central part in the film thickness direction (nB) and the ratio thereof are shown in Table 3. Further, Table 3 also shows various properties of the film. However, the nA and nB were small; therefore, the reflective properties and concealing properties of this white film were largely inferior as compared to the white film of Example 1.

TABLE 1

| | Film composition | | | | | | | |
|---|---|---|---|---|---|---|---|---|
| | Polyester resin (A) | | Immiscible component (B) | | | | Other component | |
| | | | Thermoplastic resin (B1) | | Inorganic particle (B2) | | | |
| | Type | Content (% by weight) | Type | Content (% by weight) | Type | Content (% by weight) | Type | Content (% by weight) |
| Example 1 | PET | 80 | cyclic olefin copolymer resin (b1) | 5 | titanium oxide | 15 | | |
| Example 2 | PET | 80 | cyclic olefin copolymer resin (b1) | 5 | titanium oxide | 15 | | |
| Example 3 | PET | 80 | cyclic olefin copolymer resin (b1) | 5 | titanium oxide | 15 | | |
| Example 4 | PET | 82 | cyclic olefin copolymer resin (b1) | 3 | titanium oxide | 15 | | |
| Example 5 | PET | 75 | cyclic olefin copolymer resin (b1) | 10 | titanium oxide | 15 | | |
| Example 6 | PET | 85 | cyclic olefin copolymer resin (b1) | 5 | titanium oxide | 10 | | |
| Example 7 | PET | 75 | cyclic olefin copolymer resin (b1) | 5 | titanium oxide | 20 | | |
| Example 8 | PET | 75 | cyclic olefin copolymer resin (b1) | 5 | titanium oxide | 15 | CHDM 30 mol % copolymerized PET (C1) | 5 |
| Example 9 | PET | 75 | cyclic olefin copolymer resin (b1) | 5 | titanium oxide | 15 | CHDM 60 mol % copolymerized PET (C2) | 5 |
| Example 10 | PET | 75 | cyclic olefin copolymer resin (b1) | 5 | titanium oxide | 15 | isophthalic acid 17.5 mol % copolymerized PET (C3) | 5 |
| Example 11 | PET | 75 | cyclic olefin copolymer resin (b1) | 5 | titanium oxide | 15 | PBT-PAG copolymer (D1) | 5 |
| Example 12 | PET | 57 | — | — | barium sulfate | 26 | CHDM 30 mol % copolymerized PET (C1) | 17 |

TABLE 1-continued

| | Film composition | | | | | | |
|---|---|---|---|---|---|---|---|
| | Polyester resin (A) | | Immiscible component (B) | | | | Other component |
| | | | Thermoplastic resin (B1) | | Inorganic particle (B2) | | |
| | Type | Content (% by weight) | Type | Content (% by weight) | Type | Content (% by weight) | Type | Content (% by weight) |
| Comparative Example 1 | PET | 80 | cyclic olefin copolymer resin (b1) | 5 | titanium oxide | 15 | | |
| Comparative Example 2 | PET | 80 | cyclic olefin copolymer resin (b1) | 5 | titanium oxide | 15 | | |
| Comparative Example 3 | PET | 80 | cyclic olefin copolymer resin (b1) | 5 | titanium oxide | 15 | | |
| Comparative Example 4 | PET | 83 | cyclic olefin copolymer resin (b1) | 2 | titanium oxide | 15 | | |
| Comparative Example 5 | PET | 65 | cyclic olefin copolymer resin (b1) | 20 | titanium oxide | 15 | | |
| Comparative Example 6 | PET | 90 | cyclic olefin copolymer resin (b1) | 5 | titanium oxide | 5 | | |
| Comparative Example 7 | PET | 70 | cyclic olefin copolymer resin (b1) | 5 | titanium oxide | 25 | | |
| Comparative Example 8 | PET | 95 | cyclic olefin copolymer resin (b1) | 5 | — | — | | |
| Comparative Example 9 | PET | 80 | cyclic olefin copolymer resin (b1) | 20 | — | — | | |
| Comparative Example 10 | PET | 85 | — | — | titanium oxide | 15 | | |
| Comparative Example 11 | PET | 80 | cyclic olefin copolymer resin (b1) | 5 | titanium oxide | 15 | | |

TABLE 2

| | Production method | | | | | | | |
|---|---|---|---|---|---|---|---|---|
| | Longitudinal stretching | | | | | | Transversal stretching | |
| | Preheating roll temperature (°C.) | Amount of heat Q (W/cm) | Infrared heater | | | Drawing ratio (times) | Drawing temperature (°C.) | Drawing ratio (times) |
| | | | Output (W/cm) | Distance (mm) | Time (s) | | | |
| Example 1 | 70 | 12.6 | 50 | 15 | 0.72 | 3.6 | 105 | 3.6 |
| Example 2 | 70 | 8.8 | 35 | 15 | 0.72 | 3.6 | 105 | 3.6 |
| Example 3 | 70 | 18.8 | 75 | 15 | 0.72 | 3.5 | 105 | 3.5 |
| Example 4 | 70 | 12.6 | 50 | 15 | 0.72 | 3.6 | 105 | 3.6 |
| Example 5 | 70 | 12.6 | 50 | 15 | 0.72 | 3.6 | 105 | 3.6 |
| Example 6 | 70 | 12.6 | 50 | 15 | 0.72 | 3.6 | 105 | 3.6 |
| Example 7 | 70 | 12.6 | 50 | 15 | 0.72 | 3.6 | 105 | 3.6 |
| Example 8 | 70 | 12.6 | 50 | 15 | 0.72 | 3.6 | 105 | 3.6 |
| Example 9 | 70 | 12.6 | 50 | 15 | 0.72 | 3.6 | 105 | 3.6 |
| Example 10 | 70 | 12.6 | 50 | 15 | 0.72 | 3.6 | 105 | 3.6 |
| Example 11 | 70 | 12.6 | 50 | 15 | 0.72 | 3.6 | 105 | 3.6 |
| Example 12 | 70 | 12.6 | 50 | 15 | 0.72 | 3.6 | 105 | 3.6 |
| Comparative Example 1 | 70 | 0 | 0 | — | — | 3.6 | 105 | 3.6 |
| Comparative Example 2 | 70 | 3.8 | 15 | 15 | 0.72 | 3.6 | 105 | 3.6 |
| Comparative Example 3 | 70 | 40.2 | 160 | 15 | 0.72 | — | — | — |
| Comparative Example 4 | 70 | 12.6 | 50 | 15 | 0.72 | 3.6 | 105 | 3.6 |
| Comparative Example 5 | 70 | 12.6 | 50 | 15 | 0.72 | — | — | — |
| Comparative Example 6 | 70 | 12.6 | 50 | 15 | 0.72 | 3.6 | 105 | 3.6 |
| Comparative Example 7 | 70 | 12.6 | 50 | 15 | 0.72 | — | — | — |
| Comparative Example 8 | 70 | 12.6 | 50 | 15 | 0.72 | 3.6 | 105 | 3.6 |
| Comparative Example 9 | 70 | 12.6 | 50 | 15 | 0.72 | — | — | — |
| Comparative Example 10 | 70 | 12.6 | 50 | 15 | 0.72 | 3.6 | 105 | 3.6 |
| Comparative Example 11 | 90 | 12.6 | 50 | 15 | 0.72 | 3.6 | 105 | 3.6 |

TABLE 3

| | Film thickness (μm) | Number of interfaces (10 μm) nA | | nB | | Ratio of the numbers of interfaces nB/nA | | Void Ratio vB > vA | Relative Reflectance (%) | | Total light transmittance (%) | | Specific gravity | | Flexural rigidity (mN·m) | Crease resistance (number of films/ 12 films) | | Film-forming property |
|---|---|---|---|---|---|---|---|---|---|---|---|---|---|---|---|---|---|---|
| Example 1 | 188 | 32 | A | 23 | B | 0.72 | A | A | 100.8 | B | 0.90 | A | 0.90 | A | 1.29 | 0 | A | A |
| Example 2 | 188 | 28 | B | 23 | B | 0.82 | B | A | 100.7 | B | 1.00 | B | 0.89 | A | 1.27 | 0 | A | A |
| Example 3 | 188 | 36 | A | 23 | B | 0.63 | A | A | 100.9 | B | 0.90 | A | 0.91 | B | 1.31 | 0 | A | A |
| Example 4 | 188 | 24 | C | 18 | C | 0.75 | A | A | 100.5 | B | 1.05 | B | 1.00 | B | 1.43 | 0 | A | A |
| Example 5 | 188 | 37 | A | 28 | A | 0.76 | A | A | 101.0 | A | 0.85 | A | 0.82 | A | 1.19 | 1 | B | B |
| Example 6 | 188 | 28 | B | 20 | B | 0.79 | A | A | 100.5 | B | 0.95 | B | 0.85 | A | 1.28 | 0 | A | A |
| Example 7 | 188 | 33 | A | 25 | A | 0.76 | A | A | 100.8 | B | 0.80 | A | 1.00 | B | 1.30 | 0 | A | B |
| Example 8 | 188 | 38 | A | 27 | A | 0.71 | A | A | 101.0 | A | 0.85 | A | 0.85 | A | 1.24 | 0 | A | A |
| Example 9 | 188 | 35 | A | 25 | A | 0.71 | A | A | 100.9 | A | 0.90 | A | 0.88 | A | 1.27 | 0 | A | A |
| Example 10 | 188 | 41 | A | 30 | A | 0.73 | A | A | 101.2 | A | 0.80 | A | 0.81 | A | 1.19 | 1 | B | A |
| Example 11 | 188 | 40 | A | 28 | A | 0.70 | A | A | 101.1 | A | 0.85 | A | 0.83 | A | 1.21 | 0 | A | A |
| Example 12 | 188 | 30 | A | 25 | A | 0.83 | B | A | 100.5 | B | 0.95 | B | 1.00 | B | 1.21 | 0 | A | B |
| Comparative Example 1 | 188 | 23 | C | 23 | B | 1.00 | D | D | 100.3 | C | 1.10 | C | 0.86 | A | 1.02 | 12 | C | C |
| Comparative Example 2 | 188 | 25 | B | 23 | B | 0.92 | D | D | 100.5 | B | 1.10 | C | 0.87 | A | 1.03 | 12 | C | C |
| Comparative Example 3 | Thermal deformation occurred during stretching, so that a film could not be formed. | | | | | — | — | — | — | — | — | — | — | — | — | | — | D |
| Comparative Example 4 | 188 | 19 | D | 15 | C | 0.79 | A | A | 100.1 | C | 1.20 | C | 1.05 | C | 1.45 | 0 | A | A |
| Comparative Example 5 | Film breakage occurred, so that a film could not be formed. | | | | | — | — | — | — | — | — | — | — | — | — | | — | D |
| Comparative Example 6 | 188 | 18 | D | 13 | D | 0.72 | A | A | 97.2 | D | 1.60 | D | 0.95 | B | 1.28 | 0 | A | A |
| Comparative Example 7 | Film breakage occurred, so that a film could not be formed. | | | | | — | — | — | — | — | — | — | — | — | — | | — | D |
| Comparative Example 8 | 188 | 13 | D | 10 | D | 0.77 | A | A | 97.0 | D | 1.70 | D | 1.00 | B | 1.27 | 0 | A | A |
| Comparative Example 9 | Film breakage occurred, so that a film could not be formed. | | | | | — | — | — | — | — | — | — | — | — | — | | — | D |
| Comparative Example 10 | 188 | 15 | D | 14 | D | 0.93 | D | D | 96.0 | D | 1.20 | C | 1.50 | D | 1.90 | 0 | A | A |
| Comparative Example 11 | 188 | 17 | D | 14 | D | 0.82 | B | A | 97.0 | D | 1.15 | C | 1.40 | D | 1.85 | 0 | A | A |

Industrial Applicability

The white film according to the present invention not only can be made into a thin film but also has excellent film-forming property, whiteness and reflective properties; therefore, by using the white film, a surface light source having excellent brightness characteristics can be provided.

Description Of Symbols

1: 10-μm region of surface layer part

The invention claimed is:

1. A white film, which contains voids therein and satisfies the following formulae (i) to (iii):.

$$0.6 \leq nB/nA \leq 0.9 \quad (i)$$

$$20 \leq nA \quad (ii)$$

$$15 \leq nB \quad (iii)$$

(wherein, nA represents the number of interfaces in 10 μm of the surface layer in the film thickness direction; and nB represents the number of interfaces in ±5 μm of the central part in the film thickness direction).

2. The white film according to claim 1, which satisfies the following formula (iv):

$$vB > vA \quad (iv)$$

(wherein, vA represents the void ratio in 10 μm of the surface layer in the film thickness direction; and vB represents the void ratio in ±5 μm of the central part in the film thickness direction).

3. The white film according to claim 1, wherein the white film has a flexural rigidity of not less than 1.1 (mN·m).

4. The white film according to claim 1, wherein the white film is a monolayer film.

5. The white film according to claim 1, wherein the white film is composed of a composition containing a polyester resin (A) and an immiscible component (B), in which white film the voids are formed around the immiscible component (B).

6. The white film according to claim 5, which comprises a thermoplastic resin (B1) and an inorganic particle (B2) as the immiscible component (B).

7. The white film according to claim 6, wherein the thermoplastic resin (B1) is a cyclic olefin copolymer resin (b1) and the inorganic particle (B2) is titanium oxide (b2).

8. The white film according to claim 1, wherein the white film has a specific gravity of not greater than 1.2.

9. The white film according to claim 1, wherein the white film has a total light transmittance of not higher than 1.2.

10. The white film according to claim 1, wherein the white film has a thickness of 30 μm to 500 μm.

11. The white film according to claim 1, having a relative reflectance of not lower than 100%.

12. A surface light source comprising the white film according to claim 1 and a light source.

* * * * *